United States Patent Office 3,142,929
Patented Aug. 4, 1964

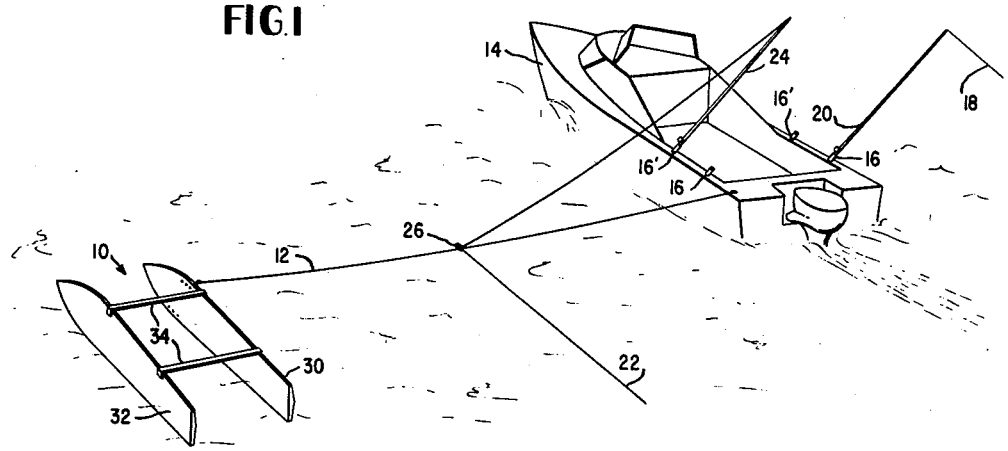
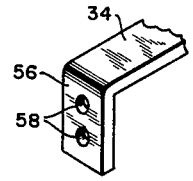
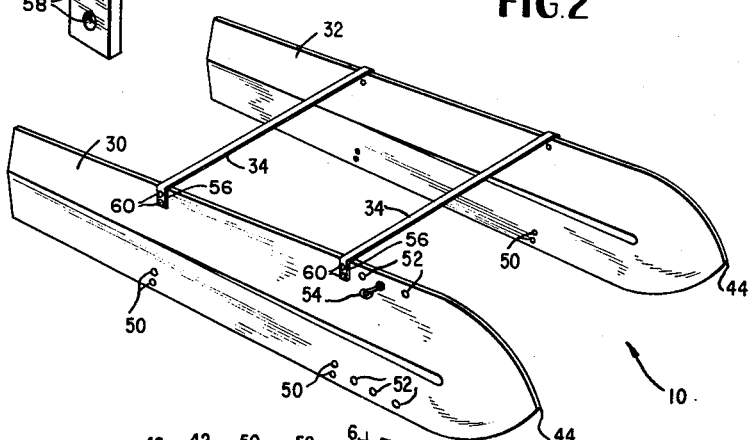
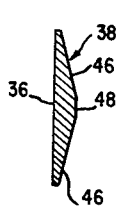
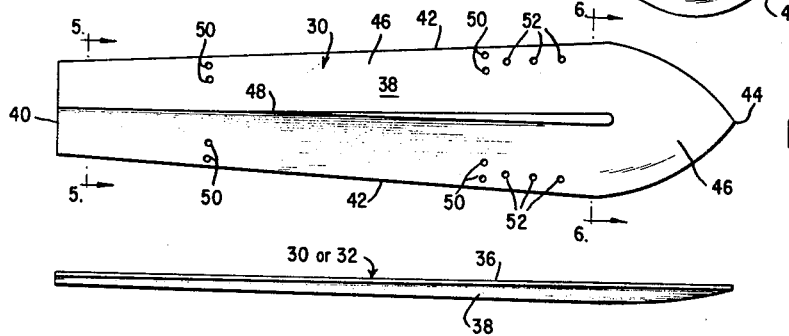
INVENTOR.
THOMAS W. KILLILEA

3,142,929
OUTRIGGER TROLLING FLOAT
Thomas W. Killilea, 594 NW. 54th St., Miami, Fla.
Filed Apr. 11, 1962, Ser. No. 186,747
1 Claim. (Cl. 43—43.13)

This invention relates to fishing gear and more particularly to a trolling outrigger, especially for use with boats.

In trolling for game fish from boats, the customary practice is to provide an outrigger boom on at least one side of the boat which in use can be swung laterally of the boat, and to which the fishing line can be removably attached so that the line and bait will be disposed laterally of the boat and of its wake. These outrigger booms are necessarily permanently attached to the trolling boats and are quite expensive. Moreover, they are primarily adapted only for larger and more expensive boats which are not readily transportable over land. Clearly, such booms are not suitable for the smaller outboard motor powered craft which the owner may move from one locale to another by means of a small trailer towed by his automobile. Such smaller craft have relatively narrow beams at the stern and would be unbalanced by a boom and the weight of the latter on the stern lowers the amount of freeboard, when such craft are towed on the highway the booms would protrude rearwardly and create a hazard, and the booms necessarily would be relatively short and restrict the distance from the side of the boat at which the fishing line can be trolled.

Having in mind the defects of the prior art devices, it is the primary object of the present invention to provide a small lightweight, inexpensive outrigger float that may be towed by any suitable boat or other source of power, and to the tow line of which a fishing line may be removably attached.

Another object of the invention is to provide a float type trolling device that is readily assembled and knocked down so that it may be conveyed easily and in a minimum of space.

A further object of the invention is to provide a trolling outrigger float that may be towed from either side of a boat.

A still further object of the invention is to provide a trolling outrigger float having simplicity of design, economy of construction and efficiency in operation.

Briefly, a trolling outrigger float in accordance with the present invention comprises a pair of buoyant boardlike members constituting runners which are of symmetrical design, tapering to a central point at the forward end and which are planar on one side and at the other side are beveled from their edges to a longitudinal centrally located ridge which terminates at the front end short of the point so that the bevel continues around the front end.

These boards are provided with two sets of two bolt holes perpendicular to each edge and spaced longitudinally thereof for the removable attachment of a pair of brace bars; and in the runner to be disposed nearest the boat, there is provided a series of bolt holes spaced forwardly of the sets of the brace bolt holes for receiving a towing eye. In assembly, the two runners are disposed parallel in spaced relation with their beveled sides facing the tow boat with the two brace bars bolted by means of the two sets of bolt holes adjacent the upper edge, and the towing eye secured in one of the towing bolt holes selected according to the desired angle and tension of the tow rope. If the float is to be used on the opposite side of the boat, then the brace bars are secured to the opposite edges and the assembly is inverted.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawing, wherein like reference characters indicate like parts throughout the several figures and in which:

FIG. 1 is a view in perspective of an outboard motor powered boat towing an outrigger trolling float according to the present invention;

FIG. 2 is a view in perspective of the trolling outrigger float from the side that is disposed toward the boat;

FIG. 3 is an elevational view of the runner that is disposed at the side of the float that faces the boat;

FIG. 4 is a plan or edge view of one of the runners;

FIGS. 5 and 6 are cross-sectional views taken on lines 5—5 and 6—6, respectively, of FIG. 3, and FIG. 7 is an enlarged fragmentary view in perspective of one end of one of the brace bars.

Referring now to the drawing in detail, specifically to FIG. 1, a trolling outrigger float 10, in accordance with the present invention, is adapted to be connected by a tow rope 12 to a boat 14 which may be provided with the usual sockets 16, 16' on each side thereof for receiving and supporting a fishing rod. In the usual practice, the line 18 from a rod 20 seated in one of the rear sockets 16 is permitted to extend directly rearwardly of the boat, whereas the line 22 of a rod 24 seated in one of the forward sockets 16' is connected by a releasable clip 26 disposed outwardly from the side of the boat by means of the outrigger. According to the present invention, the clip 26 is selectively secured to the tow rope 12.

In trolling operations when a fish is hooked, the fisherman removes the rod from the socket 16 or 16' and plays the fish in the usual manner. If the fish takes the bait on the outboard line 22, the pull on the line will release it from the clip 26 so that the line 22 then extends directly rearwardly of the boat 14 to the fish. After the fish is boated or escapes from the hook and the line 22 is reeled in for rebaiting, the fisherman then pulls in the float tow line 12 until the clip 26 is at hand and he can reinsert the fishing line 22 in the clip. The tow rope 12 is then gradually let out to the desired length and trolling is continued. The tow rope may be secured to the boat in any desired manner as by cleats or the like, and its length can be suitably regulated according to the desired lateral location of the fishing line 22.

The foregoing description is typical of the usual trolling arrangements and operations except that according to the present invention, the outrigger boom is replaced by the float 10 and tow rope 12. The float 10 is more specifically shown in FIG. 2 wherein it will be seen that it is constituted by a pair of buoyant boardlike runners 30 and 32 which are secured together in parallel spaced relation by a pair of brace bars 34 which are attached to the upper edge portions of the runners 30 and 32.

The runners themselves are preferably uniform in size and symmetrical in configuration and are substantially planar on their sides 36 which are outboard of or remote from the tow rope, whereas their opposite sides 38 which are inboard, toward or face the tow boat are beveled from their longitudinal and leading edges toward the longitudinal center, as more clearly shown in FIGS. 3, 5 and 6. The runners have blunt rear ends 40 and have longitudinal edges 42 which taper outwardly slightly along the major portion of thier length to a maximum width or depth toward the front end and then curve inwardly to a central front point 44. The bevels 46 taper from the longitudinal edges 42 toward a central longitudinal ridge 48 and this ridge terminates at its forward end approximately in line with the maximum width of the runner from which point the bevels 46 continue around to the front point 44. Thus, the runners are symmetrical in every respect so that either longitudinal edge 42 may be immersed in the water.

Each of the runners 30 and 32 are provided with two sets of bolt holes 50 spaced longitudinally of each edge 42, and each set of such bolt holes includes at least two holes disposed on a center line extending perpendicular of the adjacent edge 42. The brace bars 34 are provided at their ends with substantially right angle extensions 56 each having a set of bolt holes 58, see FIG. 7, that align with a set of the bolt holes 50. These bolt holes 50 and 58 are adapted to receive bolts 60 for releasably securing the pair of braces 34. In addition to the foregoing bolt holes, the inboard runner 30 is provided, adjacent each edge, with a series of bolt holes 52 spaced longitudinally relative to the edges 42 and forwardly of the forward set of brace bolt holes 50. The bolt holes 52 are adapted to selectively receive a towing eye 54 to which the tow rope 12 may be secured.

In assembly, as shown in FIG. 2, the runners 30 and 32 are secured together by the braces 34 with their beveled sides disposed toward the tow boat and the braces 34 secured at their upper edges. Thus, as the float is towed through the water, the bevels along the lower edge portion of the runners tend to steer the float outwardly and laterally of the tow boat 14 so that the tow rope 12 will extend substantially laterally rather than merely trail rearwardly behind the tow boat 14.

The position of the float 10 relative to the tow boat 14 and the tension of the tow rope 12 can be regulated according to the selective attachment of the towing eye 54 in one of the bolt holes 52. If the towing eye is in the forward hole 52, the tension of the rope on the float is toward the front of the float and the float is not permitted as much angulation relative to the tow rope 12 so that the float will tend to ride slightly rearwardly of the tow boat 14. On the other hand, if the eye 54 is secured in the rear of the bolt hole 52, a greater angulation is permitted so that the float 10 will tend to steer away from the tow boat to a greater degree and as a result, will maintain a greater angulation relative to the tow rope 12 and to ride substantially even with the rear of the boat 14. Obviously, if the eye 54 is secured in the intermediate bolt hole 52, the angulation between the float 10 and tow rope 12 and position of the float 10 relative to the boat 14 will be between the two aforementioned angles and positions.

The brace bars 34 and the towing eye 54 must always be attached to the upper edge portion of the runner 30 so that if the float 10 is to be attached from the opposite side of the tow boat 14 from that shown in FIG. 1, then the relationship of the braces and runners are inverted, that is, the brace bars 34 and the towing eye 54 are secured through the respective bolt holes to the runners at the edges that are shown as the bottom edges in FIG. 2 which, when disposed on the opposite side of the boat, then become the top edges. Thus, the bevels 46, along the now bottom edges, steer the float 10 from the opposite side of the tow boat 14.

Obviously, the runners 30 and 32 can be made of any suitable material including wood, fiberglass, polyethylene or other plastic materials, or any other material of sufficient buoyancy. Moreover, the float may be of any desired size and range, say, from about 2 to 6 feet in length and the cross braces 34 may be of any appropriate length and space the runners from 1 to 4 feet apart. It has been found that a convenient size for use with outboard motor boats of the more popular sizes may comprise a runner of approximately 2 feet 8 inches in length spaced by braces 34 approximately 13½ or 14 inches in length.

Runners of the foregoing length may have a maximum width or height of about 7 inches tapering to a width or height at the rear end of about 4½ inches. The maximum width and thickness of the runner is located approximately 6 inches rearwardly of the point 44. The rear sets of bolt holes 50 are approximately 7 inches forwardly of the rear end 40 with the forward set of bolt holes 50 approximately 12¾ inches forward of the rear bolt holes 50. The rear of the bolt holes 52 will be centered approximately 1 inch forward of the front set of holes 50, the middle hole 52 is about 1½ inches forward of the rear hole and the forward bolt hole is about 1½ inches forward of the middle bolt hole.

A float of the foregoing dimensions is of a size that is convenient to handle and is readily transportable by automobile, even in small compact cars. The float may be readily assembled by bolting the braces 34 in position and knocked down by unbolting such braces so that in a knocked down condition, very little space is occupied. Thus, the invention provides a highly efficient and inexpensive, lightweight and easily transportable trolling float.

Although a certain specific embodiment of the invention has been shown and described, it is obvious that many modifications thereof are possible. The invention therefore, is not to be restricted except insofar as is necessitated by the prior art and by the spirit of the appended claim.

What is claimed is:

An outrigger trolling float comprising a pair of buoyant runners, a pair of braces rigidly connecting said runners in parallel spaced relation, and tow attaching means secured to the forward portion and on the outer side of one of said runners for attaching a tow source thereto, said one runner being the inboard runner of said pair of runners and the sides of said runners corresponding to the side on which said tow attaching means is mounted being the inboard sides relative to the tow source and the opposite sides being the outboard sides, said runners being symmetrical in outline and configuration and having longitudinal edges which are substantially straight for the major portion of their length and curved at their front ends to a centrally disposed point to form skids, the outboard sides of said runners being substantially planar and the inboard sides of said runners being beveled from their longitudinal and curved forward edges to cause said runners to steer away from the direction of the tow source, said braces comprising rigid bars whose ends terminate in substantially right angle extensions having bolt holes therein, said runners having adjacent both of their edges spaced sets of bolt holes registering with the holes in the brace extensions, bolts inserted through said holes and releasably securing said braces and runners together, said tow attaching means comprising an eyebolt, and said inboard runner having a plurality of bolt holes spaced along both of its edge portions for the selective positioning of said eyebolt to vary the effective angle between said float and the tow source attached thereto, whereby the braces and eyebolts may selectively be secured to the respective edge portions and said runners may be inverted in accordance with the side from which they are to be towed.

References Cited in the file of this patent

UNITED STATES PATENTS

| | | |
|---|---|---|
| 809,965 | Lystne | Jan. 16, 1906 |
| 1,723,236 | Hansen | Aug. 6, 1929 |
| 2,572,427 | Anglim | Oct. 23, 1951 |
| 2,582,754 | Kahler | Jan. 15, 1952 |
| 2,595,947 | Jones | May 6, 1952 |